April 26, 1960    R. F. BOEHME ET AL    2,934,293
EMERGENCY OXYGEN SYSTEM FOR HIGH ALTITUDE AIRCRAFT
Filed Dec. 16, 1957    3 Sheets-Sheet 3
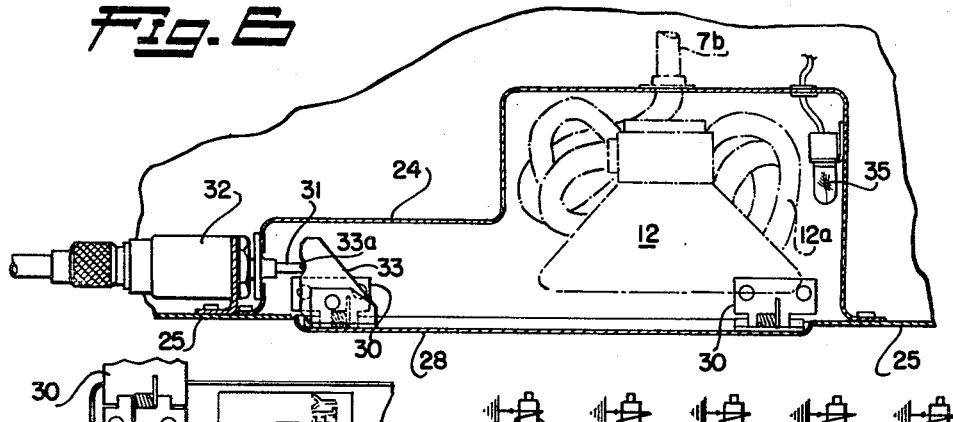
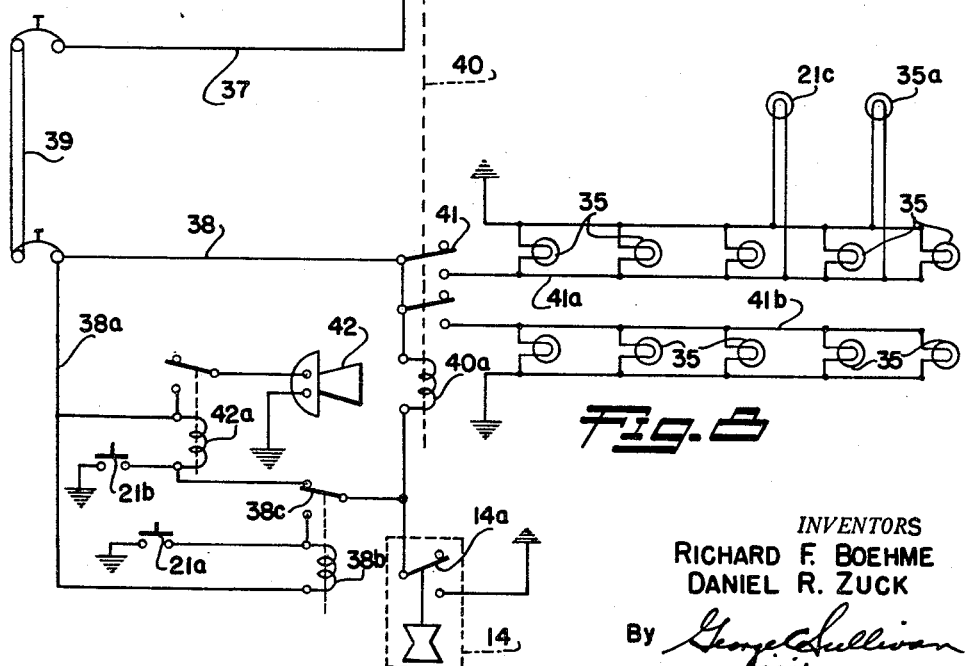
INVENTORS
RICHARD F. BOEHME
DANIEL R. ZUCK
By George C. Sullivan
Agent United States Patent Office 2,934,293
Patented Apr. 26, 1960

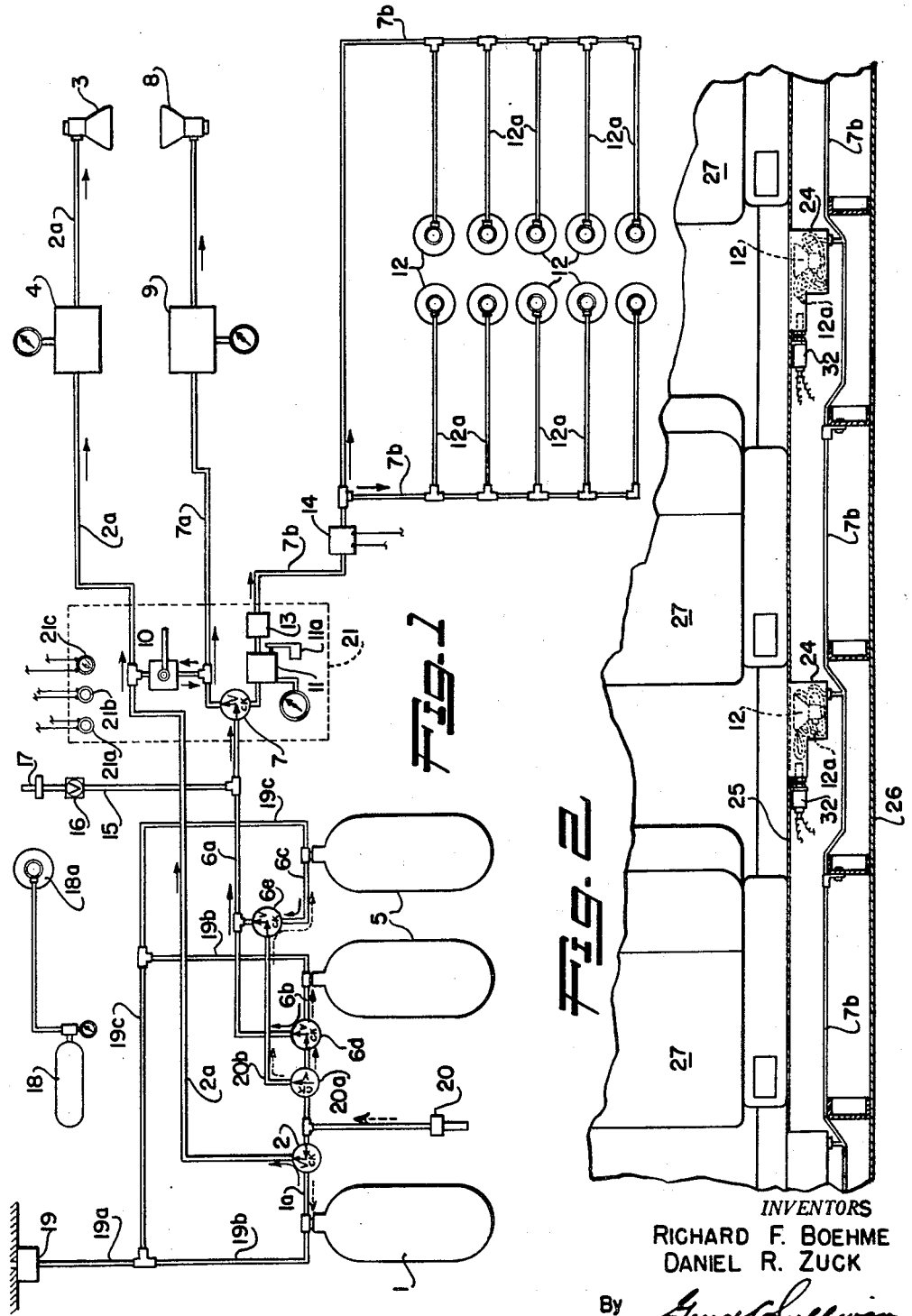

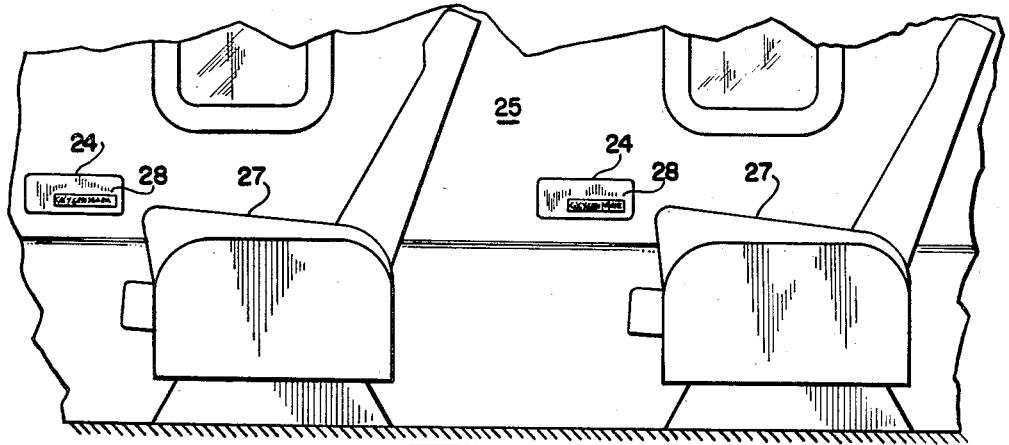
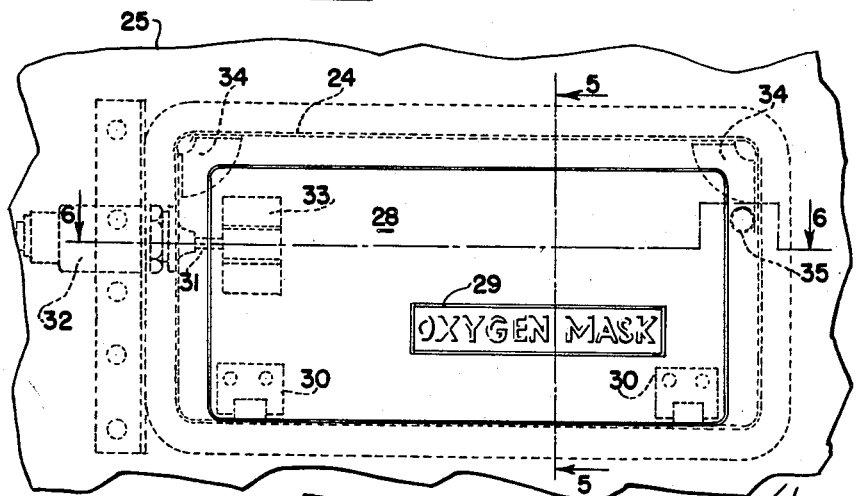
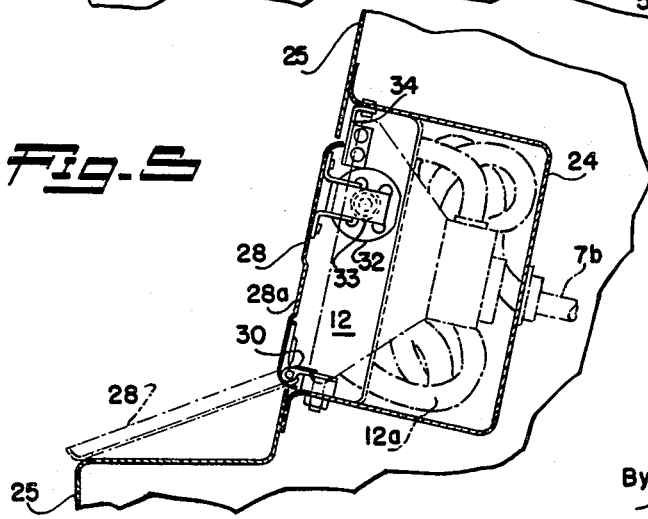

2,934,293

EMERGENCY OXYGEN SYSTEM FOR HIGH ALTITUDE AIRCRAFT

Richard F. Boehme, Los Angeles, and Daniel R. Zuck, San Fernando, Calif., assignors to Lockheed Aircraft Corporation, Burbank, Calif.

Application December 16, 1957, Serial No. 702,858

27 Claims. (Cl. 244—118)

This invention relates to an aircraft oxygen system for supplying oxygen to passengers and crew members at high altitude, and more particularly to a system and apparatus for supplying oxygen to crew member and passenger stations in the aircraft in event of an emergency caused by a loss of cabin pressurization or a cabin decompression while at a relatively high altitude.

Present day transport aircraft can maintain cruising altitudes up to 25,000 ft. above sea level while still maintaining passenger comfort by pressurizing the passenger and flight crew compartments at an altitude equivalent of about 8,000 ft. above sea level. Should a cabin decompression or depressurization occur, there is not too much danger to the passengers and crew from hypoxic hypoxia caused by a lack of oxygen as the aircraft is not at such a high altitude that the pilot could not bring the plane down to a lower altitude for the comfort of the passengers before any adverse effects are felt on the crew members or passengers due to the lack of sufficient oxygen.

Previous known devices include the use of portable oxygen tanks with an individual oxygen mask therefor and is sufficient in those circumstances where the user has knowledge of how to operate such devices. However, this will not suffice with the usual air transport passenger inasmuch as the majority of them have no knowledge of either (1) how to put the oxygen mask on, or (2) how to control or regulate the oxygen once the mask is on. Passenger instruction on this type of system is also deemed inadvisable for psychological reasons and the possible excess time taken by the passenger to get such system operating because of his inexperience with such things or the lack of ability to cope with such devices, as in the case of children. Further difficulties are apparent in this type of system, in that if such is used it would require time consuming functions on the part of crew personnel, whose functions are already of a sufficient magnitude, for instruction to the passengers; and this time consuming instruction would have to take place at each and every airline stop.

A further difficulty of both a physical and psychological nature that is thought to be present in the application of some of the present known devices to the use encompassed by this invention concerns the use of positive pressure oxygen systems. This difficulty arises by the fact that air transport passengers are composed of a group of oxygen system users having considerable differences in breathing rates which in turn results in varying rates of oxygen intake. Thus, passenger uncomfort is foreseeable by having a positive pressure oxygen feed wherein the oxygen is blown or forced into the mask from the supply. Such uncomfort can arise with a passenger having a small volume of air intake when breathing, and breathing difficulty may be encountered with the passenger is supplied with a large volume of air blown into his face. The alternative to this is to have a feed regulating device attached to the mask for the passenger to control the flow of oxygen which is undesirable, as discussed above.

Accordingly, it is an object of this invention to provide an oxygen system in a pressurizable aircraft that is readied and oxygen made available to aircraft passengers automatically when the pressure level in the aircraft cabin is reduced below a predetermined level so as to necessitate oxygen being made available on an emergency basis.

It is a further object of this invention to provide an emergency oxygen supply system for passengers and crew members in a pressurizable aircraft in which there is no manual adjustments or control operations required to be performed by the passengers.

A further object of this invention is to provide an emergency oxygen supply system for passengers in a pressurizable aircraft wherein the oxygen mask supplying oxygen to the individual passenger is of the demand type.

It is another object of this invention to provide an emergency oxygen system for a pressurizable aircraft wherein the passengers are given warning and instructions how to receive oxygen automatically.

It is a further object to provide an emergency oxygen system in a pressurizable aircraft whereby oxygen is only delivered by those oxygen receiving stations in actual use.

It is a still further object of this invention to provide an emergency oxygen system in a pressurizable aircraft with as little susceptibility to being misused or handled by the passengers when the system is not in use or not in a ready to supply oxygen condition.

Another object of this invention is to provide an emergency oxygen system for a pressurizable aircraft that is simple and easy to maintain while containing few parts, and having as much automaticity as possible for supplying oxygen to a passenger automatically when the need arises, the work to be performed by the passenger to receive oxygen being as simple as possible.

Other objects and advantages will become apparent from the following description taken in connection with the accompanying drawings in which:

Figure 1 shows a mechanical schematic of details of oxygen flow and piping arrangement in an aircraft employing one embodiment of this invention;

Figure 2 is a partial cross-sectional plan view of the left side of an aircraft cabin employing this invention when looking forward;

Figure 3 is a partial elevational view of the right side of an aircraft cabin employing this invention when facing forward;

Figure 4 is an enlarged view of the oxygen mask compartment that is at each passenger seat or location in the aircraft compartment;

Figure 5 is a cross-sectional view of the oxygen mask compartment taken along line 5—5 in Figure 4, plus a showing of the compartment door in phantom when the oxygen system is in an armed or readied condition;

Figure 6 is a view taken along line 6—6 in Figure 4;

Figure 7 shows the passenger warning notice on the inside of the oxygen mask compartment door; and Figure 8 is a schematic of the electrical circuitry for the embodiment of the invention that is schematically shown in Figure 1.

Generally stated, the invention is practiced in one embodiment by having a closable compartment at each passenger seat or station in the aircraft cabin, the compartment containing an oxygen mask that is connected to an oxygen supply. When the pressure level in the aircraft cabin is reduced to a predetermined level, an automatic actuating means supplies oxygen to each mask while at the same time the compartment door is automatically opened for passenger accessibility to the oxygen mask therein while concurrently there is an alarm set off for warning the passenger to put on his oxygen mask. Incorporated in the system are oxygen supply stations for the aircraft crew members, the oxygen supply to the crew member oxygen receiving stations controllable by the crew members themselves. Once the need for oxygen supply to the passengers arises, the only time delay for the passenger to get such oxygen is the time elapse it takes the passenger to get the mask out of the compartment and put it to his face.

Referring more particularly to the drawings, a preferred embodiment of the invention is depicted in Figure 1 wherein is shown the mechanical schematic details of an emergency oxygen supply system for passengers and crew members which consists of essentially two independent high pressure systems that are interconnected and composed of a diluter oxygen demand system for the crew members and a separate automatic 100% oxygen demand system for the passengers. There are essentially two separate oxygen supplies, one supply being the pilot's oxygen supply tank 1 which supplies oxygen to the pilot's oxygen supply manifold 2a through conduit 1a and check valve 2. The pilot can control the amount of oxygen dilution received in the pilot's oxygen mask 3 by adjustment of a dilution control regulator 4 in the pilot supply manifold 2a which is located physically in the pilot console in the crew compartment. The second oxygen supply is the copilot and passenger oxygen supply tanks 5 which supply oxygen to manifold 6a through conduits 6b, 6c and check valves 6d, 6e. Manifold 6a conducts the oxygen flow from supply tanks 5 to a two-way check 7 which directs the oxygen flow from manifold 6a to the copilot's supply manifold 7a and the passenger station supply manifold 7b. Dilution control of the oxygen received by the copilot in the copilot oxygen mask 8 is also controllable by his adjustment of the copilot dilution control 9 in the same way as the pilot controls his oxygen dilution through 4. It is intended that additional crew member oxygen receiving stations or masks can be added for other crew members such as flight engineer, radio operator, etc., as required; such additional crew member oxygen masks can be added to receive oxygen either from the supply tank 1 or supply tanks 5.

Pilot oxygen supply manifold 2a is manually interconnected with copilot and passengers oxygen supply manifolds 7a and 7b by a valve 10 and permits the pilot to draw oxygen to his oxygen mask 3 from either supply tank or supply tanks 5, or permits the copilot and passengers to draw oxygen from supply tanks 5 or from the supply tank 1. The direction of oxygen flow from supply tanks 1 and 5 are indicated by solid arrows in Figure 1.

Just downstream of check valve 7, in manifold 7b, is located an automatic pressure responsive control valve 11 which controls the arming or supply of oxygen being made available to the oxygen masks 12 located at the passenger seats or stations in the aircraft cabin, which are connected to manifolds 7b by flexible hoses 12a. Valve 11 is such that no flow of oxygen to manifold 7b is permitted until valve 11 is tripped open by a decrease of cabin pressurization to a predetermined level. Valve 11 has a handle 11a for manually opening or closing valve 11 to start or cease the flow of oxygen to manifold 7b. Immediately downstream of the control valve 11 is a pressure reducer 13 for controlling the pressure of oxygen flowing to manifold 7b. Between pressure reducer 13 and passenger oxygen masks 12 is a pressure switch 14 which is tripped to close an electrical circuit upon the tripping of valve 11 and a flow of oxygen through manifold 7b, the pressure switch 14 closing the circuit to set off system alarms or signals in the aircraft and to open stowage compartments containing the passenger oxygen masks 12 as decribed in more detail hereinafter.

From manifold 6a there is a branch conduit 15 having a manual control valve 16 and a filler adapter 17 at the end thereof for filling portable walk-around oxygen tanks as indicated at 18, and to which is connected only one oxygen mask 18a. There may be a plurality of portable walk-around emergency oxygen systems 18, 18a made available for crew members who must move around the aircraft such as hostess, flight engineers, stewards, etc. while the emergency oxygen system is in operation. Also, portable oxygen supply systems 18, 18a may be located in the aircraft lavatories.

To protect against possible excessive oxygen pressures in supply tanks 1 and 5, such as can be generated by a fire aboard the aircraft, and to prevent failure or shattering of oxygen supply tanks 1 and 5, thus releasing oxygen in the vicinity of the fire, there is an overboard outlet 19 which is connected to pressure relief valves incorporated in the caps of oxygen supply tanks 1 and 5, such connection between overboard outlet 19 and the pressure relief valves being through conduits or tubes 19a, 19b and 19c.

Filling of supply tanks 1 and 5 is provided for by a filler valve 20 common to all supply tanks. Supply tank 1 is filled by oxygen passing from filler valve 20 through check valve 2 and conduit 1a to tank 1; supply tanks 5 being filled by oxygen passing from filler valve 20 to check valve 20a where the oxygen flow is split, part going to one tank 5 through check valve 6d and conduit 6e, and the other part of the flow going to the other tank 5 from check valve 20a through conduit 20b, check valve 6e and conduit 6c. The oxygen flows for filling supply tanks 1 and 5 are indicated in Figure 1 by broken arrows.

Mounted in the cockpit is a panel 21 which contains the manually controlled valve 10, the automatic pressure responsive control valve 11 and the pressure reducer 13. Also on this panel is an alarm cutoff button 21a which permits the pilot to cut off the audible alarm signal that is set off by actuation of pressure switch 14 which will be described in more detail hereinafter. Also included is a button 21b which permits the pilot to test the audible alarm and warning lights and door opening mechanisms at each passenger station which would normally occur upon the tripping of pressure switch 14 as will also be described in more detail hereinafter. If the system test caused by actuation of button 21b indicates the system is in operable condition, illumination of indicator light 21c on panel 21 signifies such to the pilot.

Referring now to Figures 2 and 3, there is shown a compartment 24 recessed in the aircraft interior trim panel 25 between the trim panel 25 and outer fuselage surface 26, each compartment 24 being located slightly forward and at substantially armrest level of passenger seats 27. Location of compartment 24 may be at any proximate position to the seats 27, the only requirement being that the oxygen masks 12 within compartments 24 are readily accessible to the passengers.

In Figures 4, 5 and 6 are shown the details of compartments 24 having a compartment door 28 with an indicating means 29 for advising the passenger what is stowed in the compartment 24, the indicating means 29 being located in a recess 28a of door 28 as shown in Figure 5. Compartment door 28 is pivotally connected to the main portion of compartment 24 by two spring biased or spring loaded hinges 30 at the lower side of the door 28. When closed, the compartment door 28 is maintained in that position by an armature 31 of a solenoid 32 being positioned in an indentation or groove 33a of a latch member 33 that is mounted on the inner side of compartment door 28, the latching force of armature 31 in indentation 33a being sufficient to overcome the spring biased load in hinges 30. Stops 34 are mounted in the upper corners of compartment 24 to prevent the compartment door 28 from passing beyond the point of latching between armature 31 and identation 33a when the door is closed. There is a small signal lamp or light 35 mounted within compartment 24 which is illuminated by a circuit closed when pressure switch 14 is tripped, the lighting of lamp 35 being concurrent with the actuation of armature 31 of solenoid 32 to permit the door to be opened by the spring loaded hinges 30 to a position as shown in phantom in Figure 5. Lamp 35 serves as a visual signal that the passenger should don the oxygen mask 12 and also illuminates warning or instruction 36 mounted on the inner surface of door 28, which becomes visible to the passenger upon the opening of the compartment door 28. The passenger oxygen manifolds 7b are connected to the flexible tubing 12a at the back wall of compartment 24 as is most clearly shown in Figures 5 and 6.

The type of oxygen mask 12 depicted in the drawings is of a demand type necessitating in no adjustments having to be made by the passenger as all that is required to receive oxygen from the passenger oxygen supply manifold 7b is for the passenger to inhale. It is to be understood that other types of oxygen masks incorporating a manual adjustment regulator may be substituted for the demand type oxygen mask as depicted without departing from the true spirit and scope of this invention.

Figure 8 schematically shows the electrical circuit of the system as described heretofore which consists of two electrical circuits 37 and 38 connected to a 28 volt D.C. current bus bar 39 in the aircraft electrical system, the two circuits 37 and 38 being controlled simultaneously by one mechanical relay 40 which is controlled by pressure switch 14. Circuit 37 supplies current to solenoids 32 in two parallel circuits 37a and 37b through switch 37c when switch 37c is closed by mechanical relay 40. When switch 37c is closed, the current flow through solenoids 32 causes the armatures 31 to retract and release the spring loaded or biased compartment doors 28 as described above. A second switch 41, which is also actuated by mechanical relay 40, supplies current to two parallel circuits 41a and 41b from circuit 38 which serves to supply a current to the compartment signal lamps 35 when switch 41 is closed. It is to be noted that in circuit 41a there is added warning light 21c which is mounted on the control panel 21 located in the pilot's compartment, as discussed above, and a signal lamp 35a which may be mounted in the aircraft lavatory with the portable oxygen supply tank 18 as discussed above.

There is a horn 42, serving as an audible alarm, in circuit 38a which is connected in parallel with the circuit 38 leading to pressure switch 14. Horn 42 is actuated by solenoid relay 42a upon the occurrence of a flow of current passing through circuit 38a by closing of switch 14a by the tripping of pressure switch 14. The horn 42 serves as an audible alarm when the pressurization of the aircraft cabin is reduced below a certain predetermined level as set by pressure responsive control valve 11, the horn 42 going off concurrently with the opening of compartment doors 28 and illumination of signal lamps 35 so that upon the occurrence of too low a pressure level in the aircraft cabin, the passenger is made aware that he should put on oxygen mask 12 by an audible signal (horn 42), and a visual signal (compartment door 28 being opened, lamp 35 being lit and illuminating the visual warning and instructions 36 on the inner side of compartment door 28), in addition to having an oxygen mask 12 made readily accessible to him with oxygen automatically supplied thereto as controlled by valve 11.

Once the emergency system is actuated by a sufficient lowering of aircraft cabin pressurization, the pilot can cut off the sound of horn 42 by closing switch 21a mounted in his control panel 21 which in turn closes the current path through circuit 38a and solenoid relay 38b causing switch 38c to open the circuit path to solenoid relay 42a.

Also, switch 21b is available on the pilot's control panel 21 by which he can complete a current path through circuit 38a and solenoid relay 42a which will put the emergency oxygen system in operation to check out the operability of the horn 42, door opening solenoids 32 and signal lamps 35 and 23, the system test being accomplished by a flow of current passing through solenoid relay 42a for setting off horn 42 and solenoid relay 40a for actuating mechanical relay 40. It is to be noted that although compartment doors 28 are released to an open position and signal lights 35 are lit, no oxygen is transmitted to manifolds 7b until the control valve 11 is tripped. Upon opening of switch 21b the system is in a ready status as depicted in Figure 8.

In operation, the pilot can draw oxygen through his oxygen mask 3 from oxygen supply tank 1 through control or adjustment of his individual regulator 4, while the copilot can receive oxygen through his oxygen mask 8 from oxygen supply tanks 5 by adjustment of his regulator 9. Through operation of valve 10, the oxygen supplied to the pilot's oxygen mask 3 may come from oxygen supply tanks 5, or the oxygen supplied to the copilot's oxygen mask 8 may be supplied from oxygen supply tank 1. Thus the crew members can go on oxygen at any desired time or altitude without interfering with, or necessary having oxygen supplied to, the passengers' oxygen supply manifold 7b. Upon the tripping of the pressure sensitive control valve 11 by a lowering of the pressure level in the aircraft cabin below a predetermined level, oxygen immediately flows to the passengers' oxygen masks 12 through supply manifold 7b causing a tripping of pressure switch 14 which in turn causes a flow of current through solenoid relay 40a which actuates switches 37c and 41 causing the opening of compartment doors 28 by activation of solenoids 32 and the lighting of signal lamps 35 along with the setting off of horn 42 by a simultaneous current flow through solenoid relay 42a. Once the system is activated the horn can be shut off by the pilot's closing of switch 21a mounted on his control panel 21 which opens the circuit current flow to solenoid relay 42a and shuts off horn 42. Should a passenger station be unoccupied in the aircraft cabin, there is no waste or flow of oxygen through the unused oxygen mask 12, as the mask 12 is of the demand type in which there is no flow of oxygen therethrough until required by the actual use of the mask 12 for breathing purposes.

Thus it can be seen that this system provides a completely automatic supply of oxygen to each passenger station in the aircraft and accessibility to an oxygen mask upon the occurrence of a reduction in cabin pressure level below a predetermined level with the passenger's attention being called to the fact that he should put on his oxygen mask by either or both audible and/or visible signals. When the mask is ready to be put on, it is readily accessible to him, with the only act required by him being to take the oxygen mask 12 from compartment 24 and put it to his face.

Flexibility of this system is provided wherein the pilot and/or copilot may go on oxygen whenever they desire without affecting the emergency system available for the passengers. Also, flexibility is present in that the pilot and copilot may each control their own rate of oxygen dilution individually.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. In a pressurizable aircraft cabin having a plurality of passenger stations therein an emergency oxygen system comprising a plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means for tripping said first means to release the door whereby said second means will place the door in the open position, said third means being responsive to the aircraft cabin pressure level and releasing said doors to make an oxygen mask automatically accessible at each passenger station upon a loss of cabin pressurization to a predetermined level.

2. An emergency oxygen supply system in a pressurizable aircraft cabin as claimed in claim 1, wherein said first means is an electric solenoid.

3. In a pressurizable aircraft cabin having a plurality of passenger stations therein an emergency oxygen system comprising a plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means common to all compartments for tripping said first means to release the door whereby said second means will place the door in an open position, said third means being responsive to the aircraft cabin pressure level and releasing said doors to make an oxygen mask automatically accessible at each passenger station upon a loss of cabin pressurization to a predetermined level.

4. In a pressurizable aircraft cabin having a plurality of passenger stations therein an emergency oxygen system comprising an alarm, a plurality of oxygen masks, a plurality of compartments for stowage of an oxygen mask in each compartment, one of said compartments located proximate each passenger station in the aircraft cabin, each compartment including an operable door therewith, first means for restraining said door in a closed position, second means biasing said door toward an open position, and a third means for activating said alarm and tripping said first means to release the door whereby said second means will place the door in the open position, said third means being responsive to the aircraft cabin pressure level and activating the alarm and releasing said door to make an oxygen mask automatically accessible at each passenger station upon loss of cabin pressurization to a predetermined level.

5. In a pressurizable aircraft cabin having a plurality of passenger stations therein an emergency oxygen system comprising an audible alarm, a plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means for activating said audible alarm and tripping said first means to release the door whereby said second means will place the door in the open position, said third means being responsive to the aircraft cabin pressure level and activating the audible alarm and releasing said doors to make an oxygen mask automatically accessible at each passenger station upon a loss of cabin pressurization to a predetermined level.

6. An emergency oxygen supply system in a pressurizable aircraft cabin as claimed in claim 5 wherein said audible alarm is a horn.

7. In a pressurizable aircraft cabin having a plurality of passenger stations therein an emergency oxygen system comprising a plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, a visible alarm, and a third means for activating said visible alarm and tripping said first means to release the door whereby said second means will place the door in the open position, said third means being responsive to the aircraft cabin pressure level and actuating the visible alarm and releasing said door to make an oxygen mask automatically accessible at each passenger station upon loss of cabin pressurization to a predetermined level.

8. An emergency oxygen supply system in a pressurizable aircraft cabin as claimed in claim 7 wherein said visible alarm is a light located within each compartment.

9. In a pressurizable aircraft cabin having a plurality of passenger stations therein an emergency oxygen system comprising an audible alarm, a plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, a visible alarm, and a third means for activating said alarms and tripping said first means to release the door whereby said second means will place the door in the open position, said third means being responsive to the aircraft cabin pressure level and activating the alarms and releasing said doors to make an oxygen mask automatically accessible at each passenger station upon a loss of cabin pressurization to a predetermined level.

10. An emergency oxygen supply system in a pressurizable aircraft cabin as claimed in claim 9 wherein said audible alarm is a horn and said visible alarm is a light located in each compartment.

11. In a pressurizable aircraft cabin having a plurality of passenger stations therein an emergency oxygen system comprising a plurality of oxygen masks, a supply of oxygen, connecting means attaching said masks to said oxygen supply, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a pressure sensitive means in said connecting means for tripping said first means to release the door whereby said second means will place the door in the open position, said pressure sensitive means being responsive to the aircraft cabin pressure level for automatically allowing flow of oxygen from the supply to the mask and release of the compartment doors to make accessible at each passenger station an oxygen mask with oxygen supplied thereto upon a loss of cabin pressurization to a predetermined level.

12. In a pressurizable aircraft cabin having a plurality of passenger stations therein an emergency oxygen system comprising a plurality of oral-nasal type oxygen masks, a supply of oxygen, connecting means attaching said masks to said oxygen supply, a plurality of compartments for stowage of an oxygen mask within each compartment, one of said compartments located proximate each passenger station in the aircraft cabin, each compartment including an operable door therewith, first means for restraining said door in a closed position, second means for biasing said door toward an open position, and a pressure sensitive means in said connecting means for tripping of said first means to release the door whereby said second means will place the door in the open position, said pressure sensitive means being responsive to the aircraft cabin pressure level for automatically allowing flow of oxygen from the supply to the mask and release of the compartment doors to make accessible at each passenger station an oxygen mask with oxygen supplied thereto upon a loss of cabin pressurization to a predetermined level.

13. In a pressurizable aircraft cabin having a plurality of passenger stations therein an emergency oxygen system comprising a plurality of oxygen masks, a supply of oxygen, connecting means attaching said masks to said oxygen supply, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a pressure sensitive means in said connecting means for tripping of said first means to release the door whereby said second means will place the door in the open position, said pressure sensitive means being responsive to the aircraft cabin pressure level for automatically allowing flow of oxygen from the supply to the mask and release of the compartment doors to make accessible at each passenger station an oxygen mask with oxygen supplied thereto upon a loss of cabin pressurization to a predetermined level, said masks being of the demand type whereby there is no passage of oxygen through the mask until utilization of it for breathing purposes.

14. An emergency oxygen supply system in a pressurizable aircraft cabin having a plurality of passenger seats therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, a plurality of further oxygen masks, one of said further masks located proximate each passenger seat in the aircraft, means connecting said further oxygen masks to one of said oxygen supplies, and pressure sensitive control means in said connecting means, said pressure sensitive control means being responsive to the aircraft cabin pressure level for allowing flow of oxygen from said one of said oxygen supplies to each of the masks automatically upon a loss of cabin pressurization to a predetermined level while said first and second regulator means are operable to supply oxygen to the pilot and copilot oxygen masks regardless of the level of cabin pressurization.

15. An emergency oxygen supply system in a pressurizable aircraft cabin having a plurality of passenger seats therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to said oxygen supply, a second regulator between the copilot mask and second oxygen supply whereby the copilot can manually control the dilution of oxygen in the copilot oxygen mask, a plurality of further oxygen masks, one of said further masks located proximate each passenger seat in the aircraft, means connecting said further oxygen masks to one of said oxygen supplies, pressure sensitive control means in said connecting means, said pressure sensitive control means being responsive to the aircraft cabin pressure level for allowing flow of oxygen from said one of said oxygen supplies to each of the masks automatically upon loss of cabin pressurization to a predetermined level, and means interconnecting the first and second oxygen supplies with the pilot, copilot and passenger oxygen masks whereby the pilot can draw oxygen from the second oxygen supply and the copilot can draw oxygen from the first oxygen supply, while said first and second regulator means are operable to supply oxygen to the pilot and copilot oxygen masks regardless of the level of cabin pressurization.

16. An emergency oxygen supply system in a pressurizable aircraft cabin having a plurality of passenger seats therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to said second oxygen supply, a second regulator between the copilot mask and the second oxygen supply whereby the copilot can manually control the dilution of oxygen in the copilot oxygen mask, a plurality of further oxygen masks, one of said further masks located proximate each passenger seat in the aircraft, means connecting said further oxygen masks to one of said oxygen supplies, and pressure sensitive control means in said connecting means, said pressure sensitive control means being responsive to the aircraft cabin pressure level for allowing flow of oxygen from said one of said oxygen supplies to each of the masks automatically upon a loss of cabin pressurization to a predetermined level while said first and second regulator means are operable to supply oxygen to the pilot and copilot oxygen masks regardless of the level of cabin pressurization, said masks being of the demand type whereby there is no passage of oxygen through the mask until it is utilized for breathing purposes.

17. An emergency oxygen supply system in a pressurizable aircraft cabin having a plurality of passenger seats therein comprising a first and second oxygen supply, a pilot oxygen mask, said pilot oxygen mask connected to said first oxygen supply, a first regulator between the pilot mask and first oxygen supply whereby the pilot can manually control the dilution of oxygen in the pilot oxygen mask, a copilot oxygen mask, said copilot oxygen mask connected to said second oxygen supply, a second regulator between the copilot mask and the second oxygen supply whereby the copilot can manually control the dilution of oxygen in the copilot oxygen mask, a plurality of further oxygen masks, one of said further masks located proximate each passenger seat in the aircraft, means connecting said further oxygen masks to one of said oxygen supplies, and pressure sensitive control means in said connecting means, said pressure sensitive control means being responsive to the aircraft cabin pressure level for allowing flow of oxygen from said one of said oxygen supplies to each of the masks automatically upon a loss of cabin pressurization to a predetermined level while said first and second regulator means are operable to supply oxygen to the pilot and copilot oxygen masks regardless of the level of cabin pressurization, said masks being of the demand type whereby there is no passage of oxygen through the mask until it is utilized for breathing purposes.

18. An emergency oxygen supply system in a pressurizable aircraft cabin having a plurality of passenger seats therein comprising a first and second oxygen supply, a pilot oxygen mask, said pilot oxygen mask connected to said first oxygen supply, a first regulator between the pilot mask and first oxygen supply whereby the pilot can manually control the dilution of oxygen in the pilot oxygen mask, a copilot oxygen mask, said copilot oxygen mask connected to said second oxygen supply, a second regulator between the copilot mask and the second oxygen supply whereby the copilot can manually control the dilution of oxygen in the copilot oxygen mask, a plurality of further oral-nasal oxygen masks, one of said further masks located proximate each passenger seat in the aircraft, means connecting each of said further oxygen masks to one of said oxygen supplies, and pressure sensitive control means in said connecting means, said pressure sensitive control means being responsive to the aircraft cabin pressure level for allowing flow of oxygen from said one of said oxygen supplies to each of the masks automatically upon loss of cabin pressurization to a predetermined level while said first and second regulator means are operable to supply oxygen to the pilot and copilot oxygen masks regardless of the level of cabin pressurization.

19. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, a plurality of further oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means for tripping said first means to release the door whereby said second means will place the door in the open position, said third means being responsive to the aircraft cabin pressure level and releasing said doors to make an oxygen mask automatically accessible at each passenger station upon a loss of cabin pressurization to a predetermined level while said first and second regulator means are operable to supply oxygen to the pilot and copilot oxygen masks regardless of the level of cabin pressurization.

20. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, a plurality of further oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means common to all compartments for tripping said first means to release the door whereby said second means will place the door in the open position, said third means being responsive to the aircraft cabin pressure level and releasing said doors to make an oxygen mask automatically accessible at each passenger station upon a loss of cabin pressurization to a predetermined level while said first and second regulator means are operable to supply oxygen to the pilot and copilot oxygen masks regardless of the level of cabin pressurization.

21. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, an alarm means, a further plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means for activating said alarm means for tripping said first means to release the door whereby said second means will place the door in the open position, said third means being responsive to the aircraft cabin pressure level and activating the alarm means and releasing said doors to make an oxygen mask automatically accessible at each passenger station upon a loss of cabin pressurization to a predetermined level while said first and second regulator means are operable to supply oxygen to the pilot and copilot oxygen masks regardless of the level of cabin pressurization.

22. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, an audible alarm, a further plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a third means for activating said audible alarm and tripping said first means to release the door whereby said second means will place the door in the open position, said third means being responsive to the aircraft cabin pressure level and activating the audible alarm and releasing said doors to make an oxygen mask automatically accessible at each passenger station upon a loss of cabin pressurization to a predetermined level while said first and second regulator means are operable to supply oxygen to the pilot and copilot oxygen masks regardless of the level of cabin pressurization.

23. An emergency oxygen system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot mask, a further plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, a visible alarm, and a third means for activating said visible alarm and tripping said first means to release the door whereby said second means will place the door in the open position, said third means being responsive to the aircraft cabin pressure level and activating the visible alarms and releasing said doors to make an oxygen mask automatically accessible at each passenger station upon a loss of cabin pressurization to a predetermined level while said first and second regulator means are operable to supply oxygen to the pilot and copilot oxygen masks regardless of the level of cabin pressurization.

24. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and the second oxygen supply whereby the copilot can manually control the dilution of oxygen in the copilot oxygen mask, an audible alarm, a further plurality of oxygen masks, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, a visible alarm, and a third means for activating said alarms and tripping said first means to release the door whereby said second means will place the door in the open position, said third means being responsive to the aircraft cabin pressure level and activating the alarms and releasing said doors to make an oxygen mask automatically accessible at each passenger station upon loss of cabin pressurization to a predetermined level while said first and second regulator means are operable to supply oxygen to the pilot and copilot oxygen masks regardless of the level of cabin pressurization.

25. An emergency oxygen supply system in a pressurizable aircraft cabin having a plurality of passenger stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and second oxygen supply whereby the copilot can manually control the dilution of oxygen in the copilot oxygen mask, a further plurality of oxygen masks, connecting means for attaching said further masks to one of said oxygen supplies, a plurality of compartments for stowage of an oxygen mask within each compartment, one of said compartments located proximate each passenger station in the aircraft cabin, each compartment including an operable door therewith, first means for restraining said door in a closed position, second means biasing said door toward an open position, and a pressure sensitive means in said connecting means for tripping of said first means to release the door whereby said second means will place the door in the open position, said pressure sensitive means being responsive to the aircraft cabin pressure level for automatically allowing flow of oxygen from said one of said supplies to the masks and release of the compartment doors to make accessible at each passenger station an oxygen mask with oxygen supplied thereto upon loss of cabin pressurization to a predetermined level while said first and second regulator means are operable to supply oxygen to the pilot and copilot oxygen masks regardless of the level of cabin pressurization.

26. An emergency oxygen supply system in a pressurizable aircraft cabin including pilot and copilot stations therein comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and second oxygen supply whereby the copilot can manually control the dilution of oxygen in the copilot oxygen mask, and means interconnecting the first and second oxygen supplies with the pilot and copilot oxygen masks whereby the pilot can draw oxygen from the second oxygen supply or the copilot can draw oxygen from the first oxygen supply, said first and second regulator means independently and manually operable to supply oxygen to either as well as both the pilot and copilot oxygen masks regardless of whether the level of cabin pressurization is above a level to cause a hypoxic hypoxia condition with either the pilot or copilot.

27. An emergency oxygen supply system in a pressurizable aircraft cabin comprising a first and second oxygen supply, a pilot oxygen mask, said pilot oxygen mask connected to the first oxygen supply, a first regulator between the pilot mask and first oxygen supply whereby the pilot can manually control the dilution of oxygen in the pilot oxygen mask, a copilot oxygen mask, said copilot oxygen mask connected to the second oxygen supply, a second regulator between the copilot mask and second oxygen supply whereby the copilot can manually control the dilution of oxygen in the copilot oxygen mask, and means interconnecting the first and second oxygen supplies with the pilot and copilot oxygen masks whereby the pilot can draw oxygen from the second oxygen supply or the copilot can draw oxygen from the first oxygen supply, said first and second regulator means independently and manually operable to supply oxygen to either as well as both the pilot and copilot oxygen masks regardless of whether the level of cabin pressurization is above a level to cause a hypoxic hypoxia condition with either the pilot or copilot, said masks being of the demand type whereby there is no passage of oxygen through the mask until it is utilized for breathing purposes.

References Cited in the file of this patent

UNITED STATES PATENTS

| | | |
|---|---|---|
| 1,461,700 | Nichols | July 10, 1923 |
| 2,185,997 | Heidbrink | Jan. 9, 1940 |
| 2,266,939 | Thomas | Dec. 23, 1941 |
| 2,552,595 | Seeler | May 15, 1951 |